United States Patent [19]

Takeda et al.

[11] Patent Number: 4,686,447
[45] Date of Patent: Aug. 11, 1987

[54] STATIC VAR COMPENSATORS

[75] Inventors: Masatoshi Takeda, Nishinomiya; Nobuo Sashida, Kobe, both of Japan

[73] Assignee: Mitsubishi Denki Kabushiki Kaisha, Tokyo, Japan

[21] Appl. No.: 784,043

[22] Filed: Oct. 4, 1985

[30] Foreign Application Priority Data

Nov. 1, 1984 [JP] Japan .................. 59-228867

[51] Int. Cl.⁴ .......................... G05F 1/70; H02J 3/18
[52] U.S. Cl. .................................. 323/210; 323/209
[58] Field of Search ............... 323/208, 209, 210, 211; 363/39, 45, 46

[56] References Cited

U.S. PATENT DOCUMENTS 3,932,808  1/1976  Frank ..................... 323/210
4,357,570 11/1982  Schmid et al. .......... 323/210

FOREIGN PATENT DOCUMENTS 37243  3/1979  Japan .................... 323/210
741369  6/1980  U.S.S.R. ............... 323/210

OTHER PUBLICATIONS

"Static Var Compensators", Masao Yano, Mitsubishi Electric Advance Publication, Jun. 1979, pp. 5–8.
"Statis Var Compensators for Power-Transmission Lines", Masayoshi Takeda, Mitsubishi Electric Advance Publication, Jun. 1982, pp. 1–4.

Primary Examiner—Peter S. Wong
Assistant Examiner—Judson H. Jones
Attorney, Agent, or Firm—Leydig, Voit & Mayer

[57] ABSTRACT

A static var compensator connected to a line node in a power transmission system and having a capacitor and a first reactor for producing and absorbing reactive power, respectively, and a second reactor connected between the line node and the common node of the first reactor and the capacitor for providing, in combination with the capacitor and the first reactor, a maximum leading reactive capacity so as to effectively reduce the capacities of the elements and for compensating for changes in reactive power resulting from a current fluctuation in response to a load fluctuation. The second reactor increases the reactive power produced by the capacitor when the reactive power absorbed by the first reactor is low and decreases the reactive power produced by the capacitor when the reactive power absorbed by the first reactor is high.

2 Claims, 8 Drawing Figures

STATIC VAR COMPENSATORS

BACKGROUND OF THE INVENTION

This invention relates to a static var (volt-ampere reactive) compensator wherein current flowing through a reactor is controlled by static switch means such as thyristors, thereby to compensate reactive power.

FIG. 5 illustrates the principle of a static var compensator. As shown in the figure, an A. C. power source 1 has one end thereof grounded and has the other end thereof connected through a system impedance 4 to a static var compensator (SVC) 5 and also to a fluctuating load 2 such as arc furnance. The system impedance 4 denotes an impedance from the A. C. power source 1 to the node 3 between the SVC 5 and the load 2. A current transformer 6 detects current flow to the load 2, thereby to inform the SVC 5 of the fluctuation of the load 2. The SVC 5 suppresses a voltage fluctuation which is incurred at the node 3 by the fluctuation of the load 2.

FIG. 6 is a single-line connection diagram showing a prior-art SVC 5. This SVC 5 comprises a parallel connection assembly having capacitor 7 for supplying reactive power and a reactor 8 for absorbing reactive power. Static switch means 9 such as thyristors, which are connected in inverse parallel relationship, are connected in series with the reactor 8 and control current flowing through the reactor 8. The gate terminals of the static switch means 9 are connected to a controller 10, and the node between the capacitor 7 and the reactor 8 is connected to an output terminal 11.

FIG. 7 is a three-line connection diagram showing the prior-art SVC 5. In the figure, the same symbols denote identical or corresponding portions.

Referring to FIG. 5, when the current flow to the load 2 is denoted by $\dot{I}_A$, this load current $\dot{I}_A$ can be decomposed into an active current $I_{Ar}$ and a reactive current $jI_{Ai}$.

$$\dot{I}_A = I_{Ar} + jI_{Ai} \quad (1)$$

where $$j = \sqrt{-1} \quad (1)$$

Assuming now that the SVC 5 be not operating, so current $\dot{I}_{SVC} = 0$ hold, then the voltage VA at the node 3 undergoes a voltage drop ($\Delta \dot{V}$) by the product between the system impedance 4 having a value $\dot{Z}_S$ and the load current $\dot{I}_A$ when compared with the voltage $V_S$ of the A. C. power source 1.

$$\Delta \dot{V} = \dot{Z}_S \times \dot{I}_A \quad (2)$$

$\dot{Z}_S$ includes, the impedances of a transmission line or a transformer, which is substantially equal to an inductance component $jX_S$.

$$\dot{Z}_S \doteq jX_S \quad (3)$$

Accordingly, the magnitude $\Delta V$ of the voltage drop is expressed by the product between the inductance component $jX_S$ of the system impedance 4 and the reactive current $jI_{Ai}$ in the current $\dot{I}_A$ flowing to the load 2.

$$\Delta V = jX_S \times jI_{Ai} = -X_S \cdot I_{Ai} \quad (4)$$

That is, the voltage $V_A$ at the node 3 fluctuates according to the reactive current $jI_{Ai}$ which flows through the load 2. Therefore, when the load fluctuations comprise a large reactive component, for example, as in arc furnaces, the voltage at the node fluctuates greatly, thereby disturbing other power customers.

The SVC 5 is installed in order to suppress such voltage fluctuations. The current $\dot{I}_A$ flowing to the load 2 is detected by the CT 6, and the SVC 5 provides the reactive current $\dot{I}_{SVC}$ in response thereto which cancels the reactive current component in the detected current, thereby to cancel the fluctuation of the reactive current flowing through the system impedance 4 and to stabilize the voltage at the node 3.

Next, the operation of the prior-art SVC shown in FIG. 6 will be described with reference to FIG. 8. The capacitor 7 supplies the output terminal 11 with a fixed reactive power. On the other hand, the reactor 8 consumes the reactive power. Therefore, the SVC 5 supplies the output terminal 11 with the difference between the reactive power supplied by the capacitor 7 and the reactive power consumed by the reactor 8. In this regard, the current flow through the reactor 8 is controlled by the static switch means 9 so as to produce an output reactive power which cancels the reactive power detected by the controller 10. Accordingly, the fluctuation of reactive current generated by the load 2 is canceled to stabilize the voltage at the node 3.

Since the prior-art SVC is constructed as described above, there has been the problem that the capacitor, the reactor and the static switch means need to have large capacities which correspond to the maximum leading reactive capacity to be provided by the SVC, respectively.

This invention has been made in order to eliminate the problem of the prior-art apparatus as described above, and has for its object to reduce the capacities of a capacitor, a reactor and static switch means.

SUMMARY OF THE INVENTION

A static var compensator according to this invention consists in that a separate reactor is connected between the node of a reactor and a capacitor and the output terminal of the static var compensator.

In this invention, owing to the presence of the separate reactor, when reactive power consumed by the reactor is low, a voltage VC applied to the capacitor and the reactor is nearly equal to the voltage $V_{SVC}$ at the output terminal, so that reactive power to be supplied by the capacitor increases, and when the reactive power consumed by the reactor is high, the voltage $V_C$ lowers, so that the reactive power to be supplied by the capacitor decreases.

DESCRIPTION OF THE PREFERRED EMBODIMENTS

Figure 1:
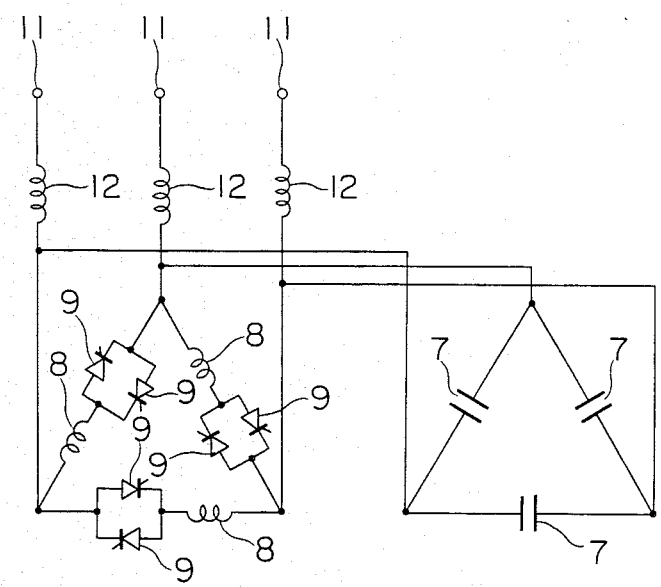
FIG. 1 is a three-line connection diagram showing one embodiment of this invention.
Figure 2:
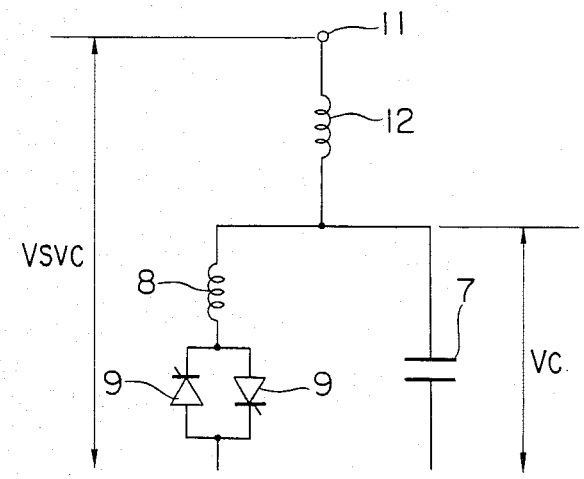
FIG. 2 is a single-line connection diagram showing the embodiment of this invention.

Now, one embodiment of this invention will be described with reference to the drawings. FIG. 1 is a three-line connection diagram showing the embodiment of this invention, in which separate reactors 12 are respectively connected between the nodes of capacitors 7 and reactors 8 connected in parallel and output terminals 11. FIG. 2 is a single-line connection diagram for explaining the embodiment of this invention.

Next, the operation of the embodiment will be described. Referring to FIG. 2, on account of the presence of the reactor 12, even when the voltage $V_{SVC}$ at the output terminal 11 is constant, a voltage $V_C$ which is applied to the capacitor 7 and the reactor 8 varies depending upon the magnitude of reactive current which passes through the reactor 12. On the other hand, reactive power which the capacitor 7 supplies is proportional to the square of the applied voltage. In this case, accordingly, the reactive power which the capacitor 7 supplies is not constant. When the reactive power consumed by the reactor 8 is low, the voltages $V_C$ and $V_{SVC}$ are approximately equal, so that the reactive power to be supplied by the capacitor 7 becomes high. Conversely, when the reactive power consumed by the reactor 8 is high, the voltage $V_C$ lowers, and the reactive power to be supplied by the capacitor 7 becomes low. That is, even when the control range of the reactor 8 is identical, reactive power in a wider range is, in effect, controllable.

Further, under the condition that when the voltage $V_{SVC}$ is 1 P. U. (power unit), the apparatus can provide a leading reactive capacity of at most 1 P. U., the reactor 12 is assumed to be of 0.2 P. U. Then, the capacitor 7 requires 1.2 P. U. As the current of the reactor 8 is increased, the voltage $V_C$ lowers. When the reactive power passing through the reactor 12 has become null, $V_C = V_{SVC}$ holds at which the output of the apparatus is null. Under this state, the reactive power which is supplied by the capacitor 7 decreases in proportion to the square of the voltage and is 1/1.2 P. U., and the reactor 8 is consuming a reactive power of 1/1.2 = 0.833 P. U. That is, the reactive power of 1 P. U. can be controlled when the capacities of the reactor 8 and static switch means 9 are 0.833 P. U.

On the other hand, as regards the capacitor 7, ordinary it supplies reactive power smaller than the maximum leading reactive capacity, and only when the maximum leading reactive capacity is necessary, it can supply great reactive power owing to the rise of the voltage by the effect of the reactor 12. Therefore, a capacitor having a small rated power may be temporarily used under an overload condition.

As stated above, according to this invention, the capacitor 7, reactor 8 and static switch means 9 can each have a small capacity, so that the miniaturization and economization of the apparatus can be achieved.

Figure 3:
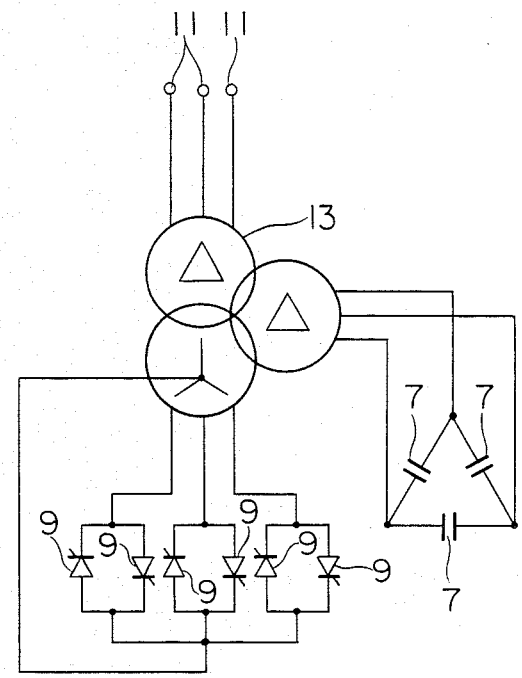
FIG. 3 is a three-line connection diagram showing another embodiment of this invention.
Figure 4:
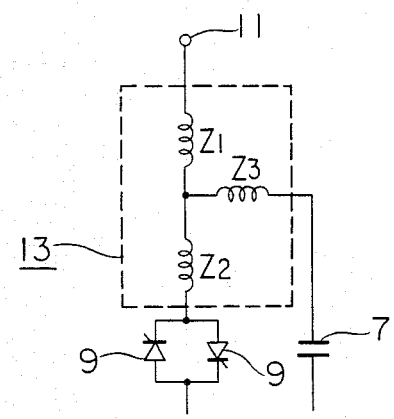
FIG. 4 is a single-line connection diagram showing the other embodiment of this invention.
Figure 5:
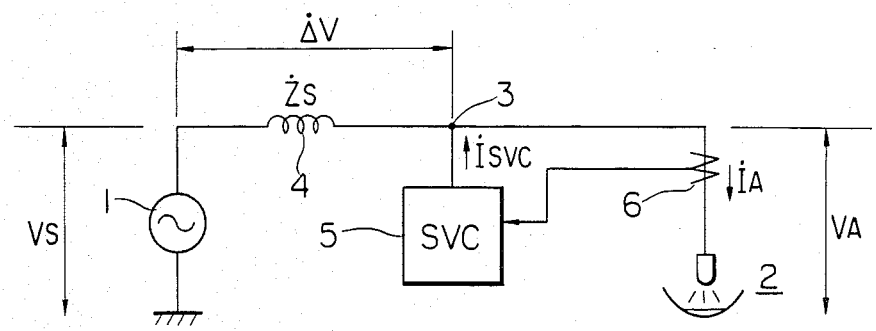
FIG. 5 is a connection diagram showing the principle of a static var compensator.
Figure 6:
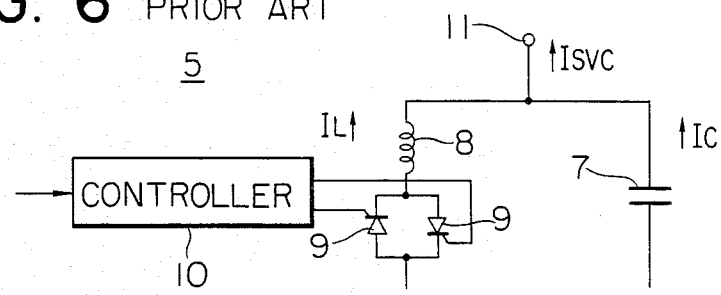
FIG. 6 is a single-line connection diagram showing a prior-art static var compensator.
Figure 7:
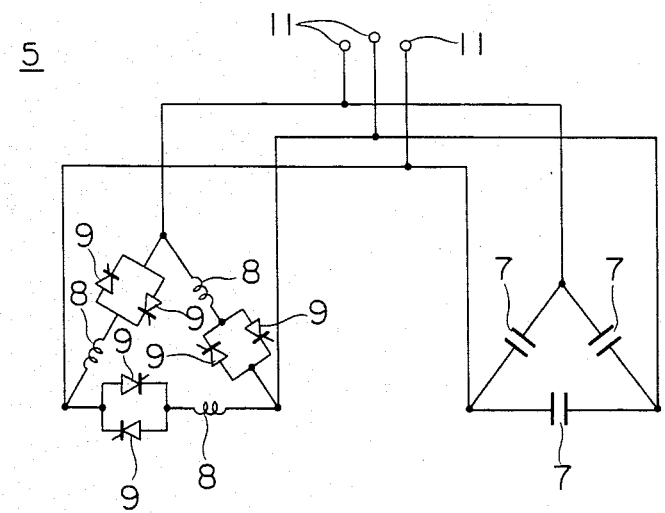
FIG. 7 is a three-line connection diagram showing the prior-art static var compensator.
Figure 8:
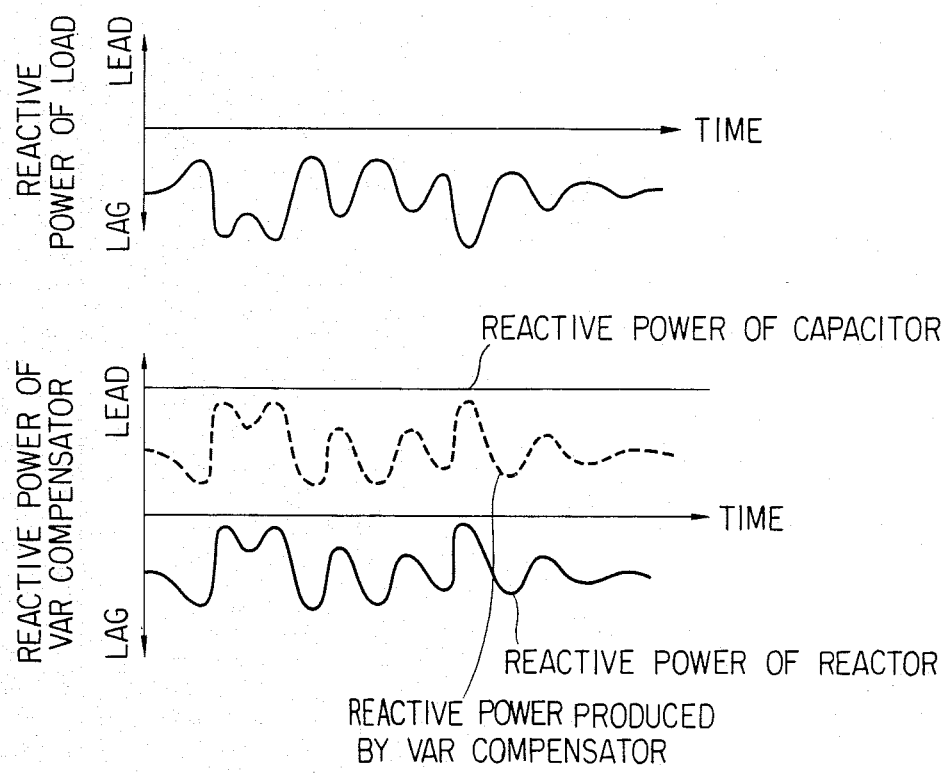
FIG. 8 is a graph showing the reactive power levels of a load and the static var compensator.

FIG. 3 is a three-line connection diagram showing another embodiment of this invention. Transformers 13 each having three windings have primary windings connected to the output terminals 11 of a var compensator, secondary windings connected to static switch means 9, and tertiary windings connected to capacitors 7. FIG. 4 is a single-line connection diagram of the other embodiment, in which the leakage impedances of the primary, secondary and tertiary windings of the transformer 13 are respectively denoted by $Z_1$, $Z_2$ and $Z_3$.

Here, the impedance $Z_1$ performs a function corresponding to the reactor 12 in FIG. 2, the impedance $Z_2$ is endowed with a comparatively great impedance and performs a function corresponding to the reactor 8 in FIG. 2 (the quantity by which it consumes reactive power is controlled by the static switch means 9), and the impedance $Z_3$ is endowed with a substantially null impedance.

With this embodiment, in addition to the foregoing effects, the transformer can be substituted for the two reactors as described above, and moreover, the secondary voltage and tertiary voltage of the transformer can be respectively set at any desired voltage permitting the static switch means and capacitor to be constructed most economically, so that an apparatus which is economical and the installation area of which is small can be provided.

As described above, according to this invention, a separate reactor is connected between the node of a reactor and a capacitor and an output terminal, whereby the capacities of the capacitor, the reactor and static switch means can be rendered small, to bring forth the effect that a small-sized and inexpensive apparatus can be fabricated.

What is claimed is:

1. In a power transmission system having a static var compensator (SVC) connected at a line node between a source and a fluctuating load for compensating for changes in reactive power resulting from load current fluctuations in response to a load fluctuation, and a current detector for monitoring load current fluctuations, said static var compensator including a capacitor and a first reactor connected in parallel at a common node and having large rated capacities for producing and absorbing reactive power, respectively, and a static switch means for controlling current flow through said first reactor so as to control the reactive power produced, the improvement in the SVC comprising:

a second reactor means separate from line reactance disposed between the line node and the common node for providing, in combination with said capacitor and said first reactor, a maximum leading reactive capacity so as to effectively reduce the capacities thereof, said second reactor means increasing the reactive power produced by said capacitor when the reactive power absorbed by said first reactor is low and decreasing the reactive power produced by said capacitor when the reactive power absorbed by said first reactor is high.

2. A static var compensator according to claim 3 comprising a transformer having a primary winding connected between the line node and the common node to provide said second reactor means, a secondary winding connected between the common node and said static switch means to provide said first reactor, and a tertiary winding connected between the common node and said capacitor to provide a substantially null impedance.

* * * * *